(12) United States Patent
Yamazaki et al.

(10) Patent No.: US 10,796,162 B2
(45) Date of Patent: Oct. 6, 2020

(54) INFORMATION PROCESSING APPARATUS, INFORMATION PROCESSING METHOD, AND INFORMATION PROCESSING SYSTEM

(71) Applicant: TOSHIBA TEC KABUSHIKI KAISHA, Tokyo (JP)

(72) Inventors: Keita Yamazaki, Mishima Shizuoka (JP); Masaaki Yasunaga, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 141 days.

(21) Appl. No.: 16/108,015

(22) Filed: Aug. 21, 2018

(65) Prior Publication Data
US 2019/0087663 A1 Mar. 21, 2019

(30) Foreign Application Priority Data

Sep. 19, 2017 (JP) .................. 2017-179447

(51) Int. Cl.
*G06K 9/00* (2006.01)
*G06Q 30/06* (2012.01)
(Continued)

(52) U.S. Cl.
CPC ..... *G06K 9/00771* (2013.01); *G06K 9/00624* (2013.01); *G06Q 10/087* (2013.01);
(Continued)

(58) Field of Classification Search
CPC .. G06K 9/00771; G06K 9/00; G06K 9/00624; G06K 9/00621; G06K 9/6201; G06K 9/46; G06K 9/66; G06K 9/00288; G06K 9/00671; G06K 9/2063; G06K 9/22; G06K 9/62; G06K 9/0063; G06K 9/4604;
(Continued)

(56) References Cited

U.S. PATENT DOCUMENTS

2015/0262116 A1* 9/2015 Katircioglu .......... G06Q 10/087
705/28
2015/0379366 A1 12/2015 Nomura et al.
(Continued)

FOREIGN PATENT DOCUMENTS

WO 2016117600 A1 7/2016

OTHER PUBLICATIONS

Extended European Search Report dated Feb. 12, 2019 in corresponding European Patent Application No. 18195532.9, 7 pages.

*Primary Examiner* — Jose L Couso
(74) *Attorney, Agent, or Firm* — Kim & Stewart LLP

(57) ABSTRACT

An information processing apparatus includes a camera interface configured to connect to a camera, and a processor configured to control the camera via the camera interface to capture an image of a plurality of articles and a shelf displaying the articles, determine a plurality of article IDs for the articles shown in the captured image using a feature value of each of the articles, and based on shelf allocation plan information that associates a shelf ID of each of a plurality of shelves with a plurality of article IDs for articles displayed on the shelf, determine a shelf ID of the shelf shown in the captured image. The determined shelf ID is associated with one or more of the determined article IDs.

18 Claims, 5 Drawing Sheets

(51) Int. Cl.
*G06T 7/73* (2017.01)
*G06T 7/13* (2017.01)
*G06T 7/11* (2017.01)
*G06Q 10/08* (2012.01)

(52) U.S. Cl.
CPC ..... *G06Q 30/0621* (2013.01); *G06Q 30/0639* (2013.01); *G06T 7/11* (2017.01); *G06T 7/13* (2017.01); *G06T 7/73* (2017.01)

(58) Field of Classification Search
CPC ....... G06K 2009/4666; G06K 2209/27; G06K 17/00; G06T 7/11; G06T 7/73; G06T 7/13; G06T 7/246; G06T 2207/10016; G06T 2207/30242; G06Q 10/087; G06Q 10/0621; G06Q 10/0639; G06Q 10/0875; G06Q 10/00; G06Q 50/28; G06Q 20/203; G06Q 30/0635; G06Q 30/0643; B65G 1/137; B65G 1/02; H04N 7/18; H04N 7/185; H04N 5/23238; G05D 1/0246; G05D 2201/0216; A47F 5/0043; A47F 2010/025
See application file for complete search history.

(56) References Cited

U.S. PATENT DOCUMENTS

| | | | |
|---|---|---|---|
| 2016/0379367 A1 | 12/2016 | Yasunaga | |
| 2017/0278056 A1* | 9/2017 | Itou | B65G 1/137 |
| 2017/0278057 A1* | 9/2017 | Itou | G06Q 30/06 |
| 2018/0002109 A1 | 1/2018 | Yamashita | |
| 2018/0251253 A1* | 9/2018 | Taira | G06F 3/147 |
| 2019/0005569 A1* | 1/2019 | Kotha | G06F 16/29 |

* cited by examiner

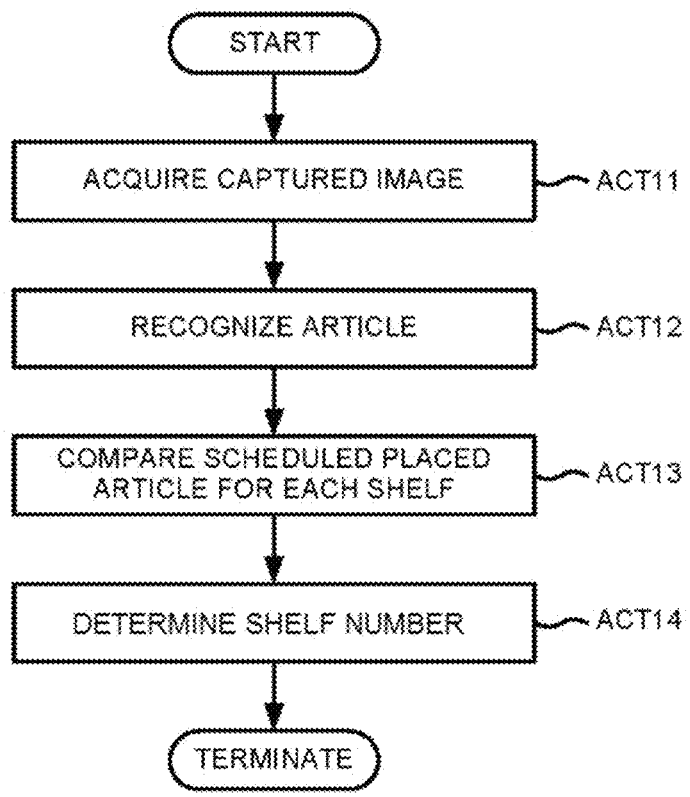
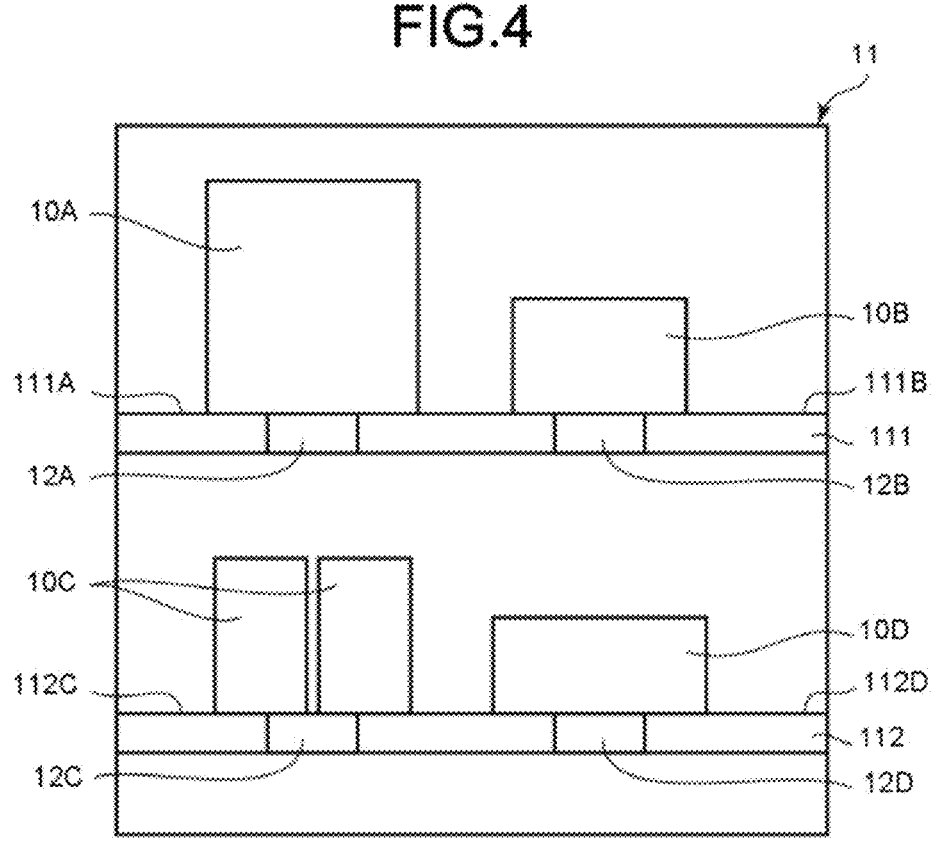

FIG.5

| SHELF NUMBER | TRAY NUMBER | SHELF POSITION NUMBER | IDENTIFICATION CODE OF ARTICLE | FACE QUANTITY | FACE SURFACE | CUMULATIVE DISPLAY QUANTITY |
|---|---|---|---|---|---|---|
| 1 | 1 | 1 | IDENTIFICATION CODE OF ARTICLE 10A | 1 | 1 | 1 |
| 1 | 1 | 2 | IDENTIFICATION CODE OF ARTICLE 10B | 1 | 1 | 1 |
| 1 | 2 | 1 | IDENTIFICATION CODE OF ARTICLE 10C | 2 | 1 | 1 |
| 1 | 2 | 2 | IDENTIFICATION CODE OF ARTICLE 10D | 1 | 1 | 1 |
| 2 | 1 | 1 | IDENTIFICATION CODE OF ARTICLE 10E | 1 | 1 | 1 |
| 2 | 2 | 1 | IDENTIFICATION CODE OF ARTICLE 10F | 1 | 1 | 1 |
| ⋮ | ⋮ | ⋮ | ⋮ | ⋮ | ⋮ | ⋮ |
| 3 | 1 | 1 | IDENTIFICATION CODE OF ARTICLE 10D | 2 | 1 | 1 |
| ⋮ | ⋮ | ⋮ | ⋮ | ⋮ | ⋮ | ⋮ |

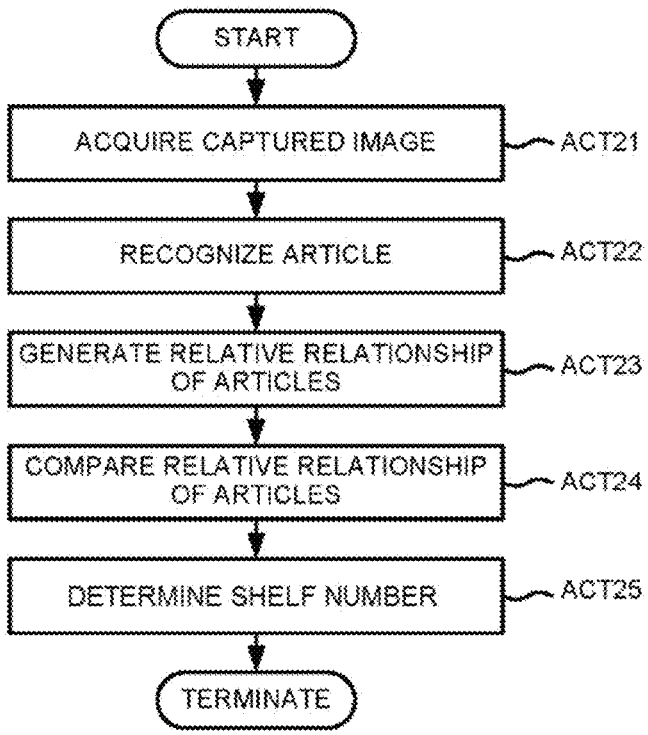

FIG.6

INFORMATION PROCESSING APPARATUS, INFORMATION PROCESSING METHOD, AND INFORMATION PROCESSING SYSTEM

CROSS-REFERENCE TO RELATED APPLICATION

This application is based upon and claims the benefit of priority from Japanese Patent Application No. 2017-179447, filed in Sep. 19, 2017, the entire contents of which are incorporated herein by reference.

FIELD

Embodiments described herein relate generally to an information processing apparatus, an information processing method, and an information processing system.

BACKGROUND

In a grocery store, various kinds of commodities are displayed on store shelves according to a commodity layout plan. To maintain the displayed commodities and detect missing commodities, a store clerk periodically looks around the store to check the shelves one by one.

On the other hand, a conventional technique is known for predicting a location where the arrangement of the commodities is likely to change using an image of the entire floor, and capturing an image at the location with a portable image capturing device. By determining whether the commodities are shown in the captured image according to the predetermined arrangement, it is possible to check if the commodities are arranged in the commodity shelf properly in real time.

However, even using such a conventional method, it is difficult for a store clerk to identify exactly which shelf is being checked. Thus, there is a need for an automated scheme to identify the store shelf being checked.

DESCRIPTION OF THE DRAWINGS

FIG. 3 is a flowchart for depicting an example of shelf determination by the shelf determination system according to a first embodiment;

FIG. 4 is a diagram illustrating an example of a captured image according to the first embodiment;

FIG. 5 is an example illustrating a part of shelf management information common to the respective embodiments;

FIG. 6 is a flowchart for depicting an example of shelf determination by a shelf determination system according to a second embodiment;

DETAILED DESCRIPTION

In accordance with an embodiment, an information processing apparatus comprises a camera interface configured to connect to a camera, and a processor configured to control the camera via the camera interface to capture an image of a plurality of articles and a shelf displaying the articles, determine a plurality of article IDs for the articles shown in the captured image using a feature value of each of the articles, and based on shelf allocation plan information that associates a shelf ID of each of a plurality of shelves with a plurality of article IDs for articles displayed on the shelf, determine a shelf ID of the shelf shown in the captured image. The determined shelf ID is associated with one or more of the determined article IDs.

Hereinafter, first, second and third embodiments will be described with reference to the accompanying drawings.

First Embodiment

In the first embodiment, shelf determination using a recognition result of an article is described.

Figure 1:
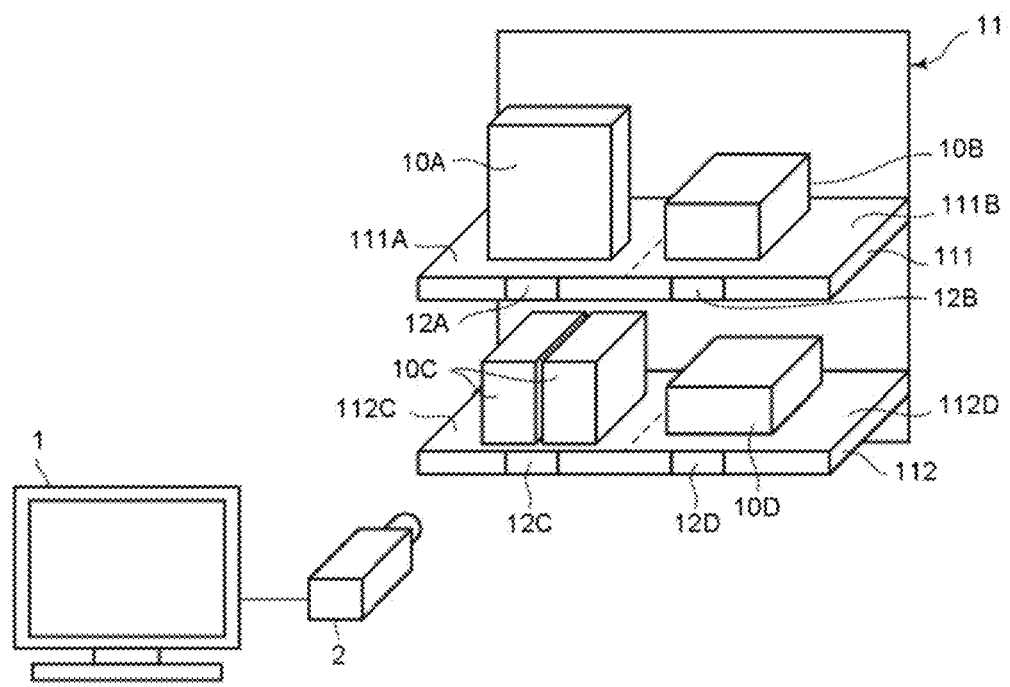
FIG. 1 is a diagram illustrating an example of a shelf determination system common to respective embodiments.

FIG. 1 is a diagram illustrating an example of a shelf determination system or an information processing system according to the first embodiment. The shelf determination system shown in FIG. 1 has essentially the same basic configuration as those in the second and third embodiments, and description of the same configuration is omitted as appropriate. As shown in FIG. 1, the shelf determination system includes a shelf information determination apparatus or an information processing apparatus 1 and a camera 2. The camera 2 photographs an area including a shelf on which one or more articles are displayed, and outputs the captured image to the shelf information determination apparatus 1. The shelf information determination apparatus 1 recognizes one or more articles contained in the captured image from the camera 2 to determine shelf identification information (e.g., shelf number) of a shelf on which one or more articles are displayed based on recognition results of the one or more articles.

For example, the shelf information determination apparatus 1 acquires shelf management information from a database (DB) stored in an external apparatus. For example, the shelf management information includes the shelf identification information (shelf number (shelf ID)) for identifying each shelf, tray identification information (tray number) for identifying tray contained in each shelf, shelf position identification information (shelf position number) for identifying a shelf position contained in the shelf (each tray), article specifying information for identifying an article placed at each shelf position, number of faces of the article placed at each shelf position, face surface of the article placed at each shelf position, and cumulative display quantity of articles placed at each shelf position in an associated manner.

The article specifying information is used for specifying an article in the captured image, and is obtained by associating an article identification information (article identification code) with at least one of image information the article, a local feature value information contained in the image information relating to the article, and shelf label identification information recorded or stored in a shelf label attached in correspondence with each shelf position. For example, the article identification information includes information unique to the article and type information of the article. The shelf management information includes information indicating which type of article is placed at which position on which shelf.

The article identification information may be recorded or stored in the shelf label. The shelf label may be a paper tag or medium or an electronic information storage tag or medium. If the shelf label is the paper medium, information is recorded (i.e., printed) with a two-dimensional code, a QR Code®, or the like, and if the shelf label is the electronic information storage medium, information is stored according to a predetermined format. The electronic information storage medium outputs the article identification information, for example, by displaying the article identification information or transmitting it through wireless communication.

The number of faces of the article placed at each shelf position indicates the number of the same articles displayed side by side. Specifically, if the same articles are placed side by side in one row, the number of faces is "1", and if the same articles are placed side by side in two rows, the number of faces is "2". The face surface of the article placed at each shelf position indicates a surface of the article that faces the front surface of a shelf 11, i.e., a surface that faces the camera 2 among the plural surfaces constituting the article. "1", "2", "3", "4", "5", and "6" are allocated to respective surfaces of the article if the article is a rectangular parallelepiped (six surfaces), and if the surface facing the camera 2 is "1", the face surface of the article is "1". The cumulative display quantity of the articles indicates the number of the same articles displayed in a vertical direction. Specifically, if the same articles are stacked in the vertical direction in one row, the cumulative display quantity of the articles is "1", and if the same articles are stacked in the vertical direction in two rows, the cumulative display quantity of the articles is "2".

A part of the shelf management information (association of the shelf identification information, the tray identification information, the shelf position identification information and the article identification information) is referred to as shelf allocation plan information.

For example, the shelf information determination apparatus 1 recognizes the article specifying information of a plurality of articles contained in the captured image based on the article management information, and recognizes the shelf position identification information for identifying the shelf position where the respective articles are placed. The shelf information determination apparatus 1 determines the shelf identification information for identifying the shelf on which the plural articles contained in the captured image are placed based on the shelf management information and shelf position identification information contained in the recognition result.

For example, the camera 2 photographs an area including the shelf 11 on which articles 10A, 10B, 10C, and 10D are displayed. For example, the shelf 11 includes a first tray 111 and a second tray 112. The first tray 111 includes shelf positions 111A and 111B, and the second tray 112 includes shelf positions 112C and 112D. The article 10A is displayed at the shelf position 111A. Further, a shelf label 12A may be attached to the shelf position 111A. The article 10B is displayed at the shelf position 111B. Further, a shelf label 12B may be attached at the shelf position 111B. The article 10C is displayed at the shelf position 112C. Furthermore, a shelf label 12C may be attached at the shelf position 112C. The article 10D is displayed at the shelf position 112D. Further, a shelf label 12D may be attached at the shelf position 112D.

The shelf label 12A includes the article identification information relating to the article 10A displayed at the shelf position 111A, the shelf label 12B includes the article identification information relating to the article 10B displayed at the shelf position 111B, the shelf label 12C includes the article identification information relating to the article 10C displayed at the shelf position 112C, and the shelf label 12D includes the article identification information relating to the article 10D displayed at the shelf position 112D.

Figure 2:
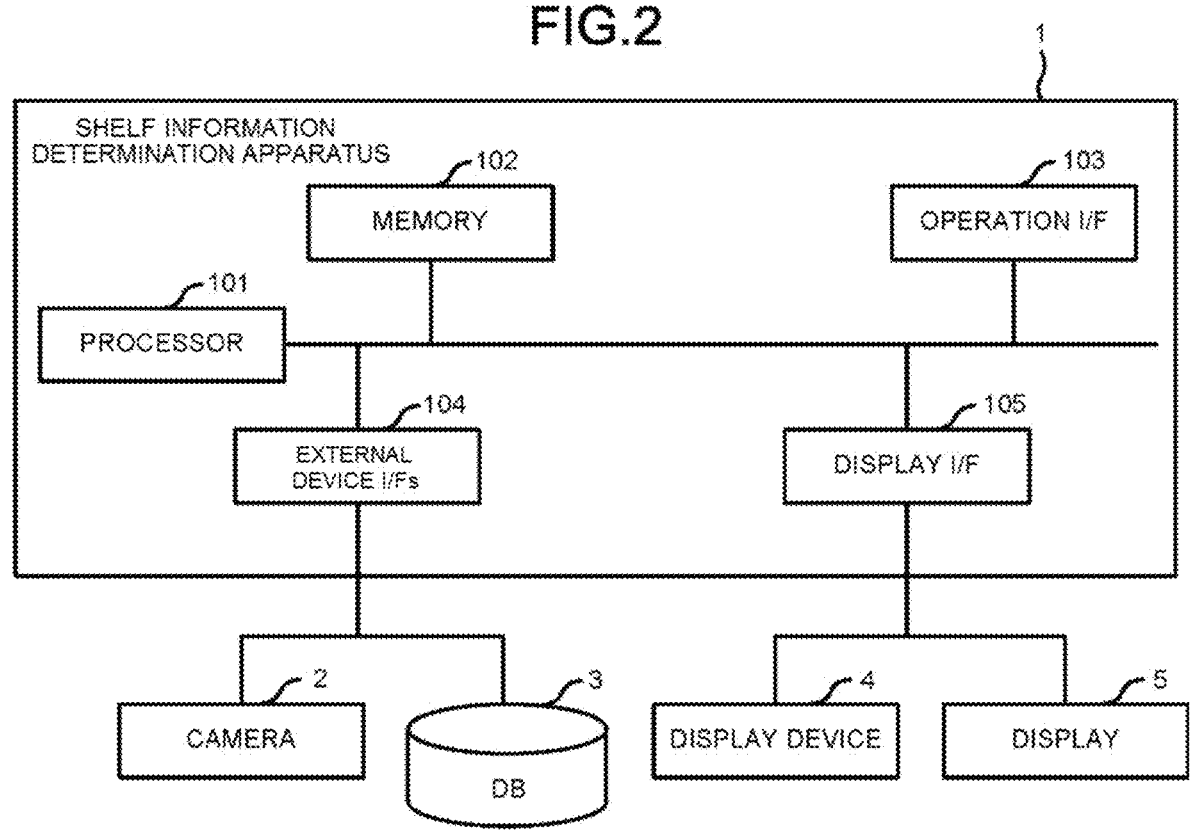
FIG. 2 is a block diagram illustrating an example of a shelf information determination apparatus common to the respective embodiments.

FIG. 2 is a block diagram illustrating an example of the shelf information determination apparatus according to the first embodiment. The shelf information determination apparatus shown in FIG. 2 has essentially the same basic configuration as those in the second and third embodiments, and thus the description of the same configuration is omitted as appropriate. As shown in FIG. 2, the shelf information determination apparatus 1 includes a processor 101, a memory 102, an operation I/F 103, one or more external device I/Fs 104, and a display I/F 105.

The processor 101 is, for example, a Central Processing Unit (CPU), which copies or decompresses a program stored in the memory 102 to execute the program, thereby executing various information processes, such as a recognition process of the article contained in the captured image and a shelf information determination process for estimating the shelf (shelf identification information) on which the article contained in the captured image is placed, based on the shelf management information.

The memory 102 is, for example, a semiconductor memory such as a built-in or external flash memory, a Hard Disk Drive (HDD), and a Solid State Drive (SSD). The memory 102 may be a Random Access Memory (RAM), a Read Only Memory ROM), and the like, or may have a different configuration from the RAM and the ROM. The memory 102 may store the shelf management information.

The operation I/F 103 is used for acquiring information from a device that receives an operation input such as a keyboard. The operation I/F 103 can acquire the information through a wireless or wired manner.

The external device I/Fs 104 include an interface for acquiring the captured image from the camera 2 (e.g., a Universal Serial Bus (USB) interface) and an interface for acquiring the shelf management information contained in the database (DB) 3 (e.g., a network interface). For example, the shelf management information is retrieved from an external apparatus with the external device I/F 104 via a wired or a wireless network. Alternatively, the shelf management information may be stored in the memory 102 in advance.

The display I/F 105 is an interface for outputting a recognition result of the article contained in the captured image and a determination result of the shelf on which the article contained in the captured image is placed to a display device 4 and a display 5.

FIG. 3 is a flowchart for depicting an example of shelf determination by the shelf determination system according to the first embodiment. As shown in FIG. 3, the processor 101 of the shelf information determination apparatus 1 acquires the captured image captured by the camera 2 via the external device I/F 104 (ACT 11).

FIG. 4 is a diagram illustrating an example of the captured image. As shown in FIG. 4, the captured image includes the shelf 11, the articles 10A, 10B, 10C and 10D, the shelf labels 12A, 12B, 12C and 12D, and the like. Here, an example of the captured image acquired by photographing the shelf 11 to which the shelf labels 12A, 12B, 12C and 12D are attached is shown. However, the shelf labels 12A, 12B, 12C and 12D are not necessarily attached to the shelf 11. If the shelf labels 12A, 12B, 12C and 12D are not attached to the shelf 11, the captured image only contains the shelf 11 and the articles 10A, 10B, 10C and 10D, and does not contain the shelf labels 12A, 12B, 12C and 12D.

Based on the shelf management information, the processor 101 recognizes a plurality of articles contained in the captured image (ACT 12). For example, the processor 101 recognizes the article identification information of the articles 10A, 10B, 10C and 10D contained in the captured image shown in FIG. 4. As a result, the processor 101 can recognize the types of the plural articles contained in the captured image. Any method may be used for recognizing the article as long as the type of the article in the captured image can be specified, such as a template matching, a feature point matching, etc.

The processor 101 may recognize the shelf label identification information from the shelf label (the shelf label at the shelf position where the respective articles are placed) contained in the captured image based on the shelf management information to acquire the article identification information associated with the shelf label identification information. Instead of the shelf label identification information, the article identification information may be recorded or stored in the shelf label. In this case, the article identification information is recognized from the shelf label. In this way, by recognizing the shelf label, the article identification information can be obtained irrespective of whether the article is placed or not. For example, the article identification information is recognized from the shelf labels 12A, 12B, 12C, and 12D corresponding to the shelf positions 111A, 111B, 112C, and 112D on which the articles 10A, 10B, 10C, and 10D contained in the captured image shown in FIG. 4 are placed respectively.

Both the recognition process of the article and the recognition process of the shelf label may be used in combination, or either one of the recognition processes may be performed.

The processor 101 compares the shelf management information (shelf allocation plan information) with the article identification information contained in the recognition result (ACT 13), and based on the comparison result, determines the shelf identification information (i.e., shelf number) for the shelf on which a plurality of articles contained in the captured image is placed (ACT 14). Specifically, the processor 101 determines the shelf identification information for specifying the shelf on which a plurality of articles contained in the captured image is placed.

FIG. 5 is an example illustrating a part of the shelf management information. For example, an article manager displays the articles on the shelf 11 based on the shelf management information. The shelf information determination apparatus 1 can refer to the shelf management information with a shelf number input from the operation I/F 103 to obtain the information corresponding to the input shelf number.

The determination of the shelf on which a plurality of articles contained in the captured image is placed is further described. For example, the processor 101 outputs the shelf identification information relating to the shelf on which most of the plural articles contained in the captured image are placed as a determination result. Specifically, the processor 101 outputs the shelf identification information with which most of the article specifying information (article identification information) of the plural articles contained in the captured image is associated as the determination result. In other words, the processor 101 compares the article specifying information corresponding to the plurality of articles contained in the captured image with the article specifying information associated with the shelf identification information to output the shelf identification information with the highest concordance rate as the determination result.

The processor 101 may output the shelf identification information to which most types of the plural articles contained in the captured image belong as the determination result. In other words, the processor 101 compares the types of the plural articles contained in the captured image with the types of articles associated with the shelf identification information, and outputs the shelf identification information having the highest concordance rate as the determination result.

For example, in the examples in FIG. 4 and FIG. 5, the shelf identification information (shelf number 1) with which most of the article specifying information (for example, the article identification codes of the articles 10A, 10B, 10C and 10D) of the articles 10A, 10B, 10C and 10D contained in the captured image is associated is output as the determination result. As the determination result, the shelf identification information may be output together with the article specifying information (for example, the article identification codes of the articles 10A, 10B, 10C and 10D) contained in the recognition result. The captured image may be divided into several blocks, and the shelf identification information may be output together with the article specifying information of the articles contained in each divided block. Alternatively, the shelf identification information may be output together with images of a plurality of articles contained in the captured image.

Second Embodiment

In the second embodiment, the shelf determination using the relative positional relationship among the articles is described.

The shelf determination system according to the second embodiment has the same basic configuration as that in the first embodiment. In the second embodiment, mainly the difference from the first embodiment is described.

Figure 7:
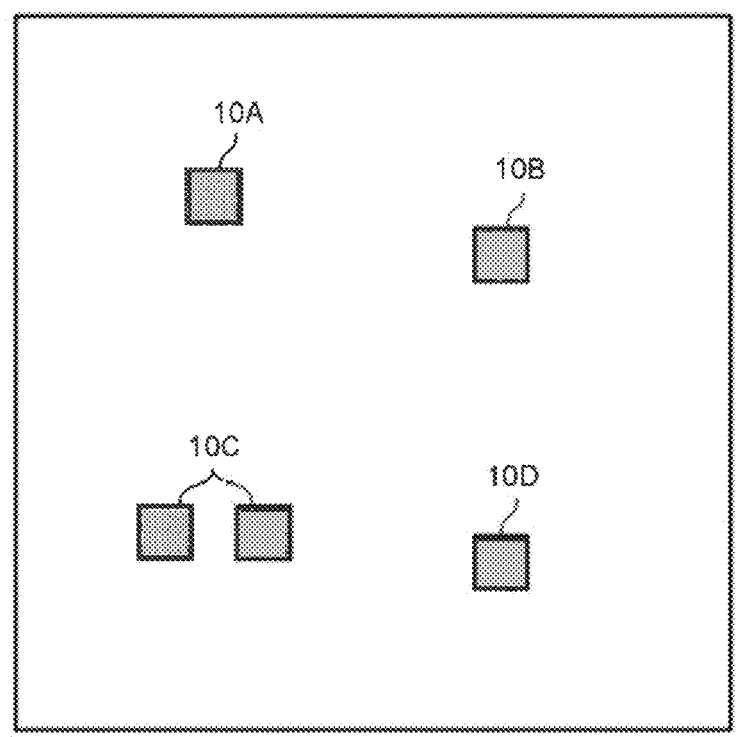
FIG. 7 is a diagram illustrating an example of a relative relationship among articles according to the second embodiment.
Figure 8:
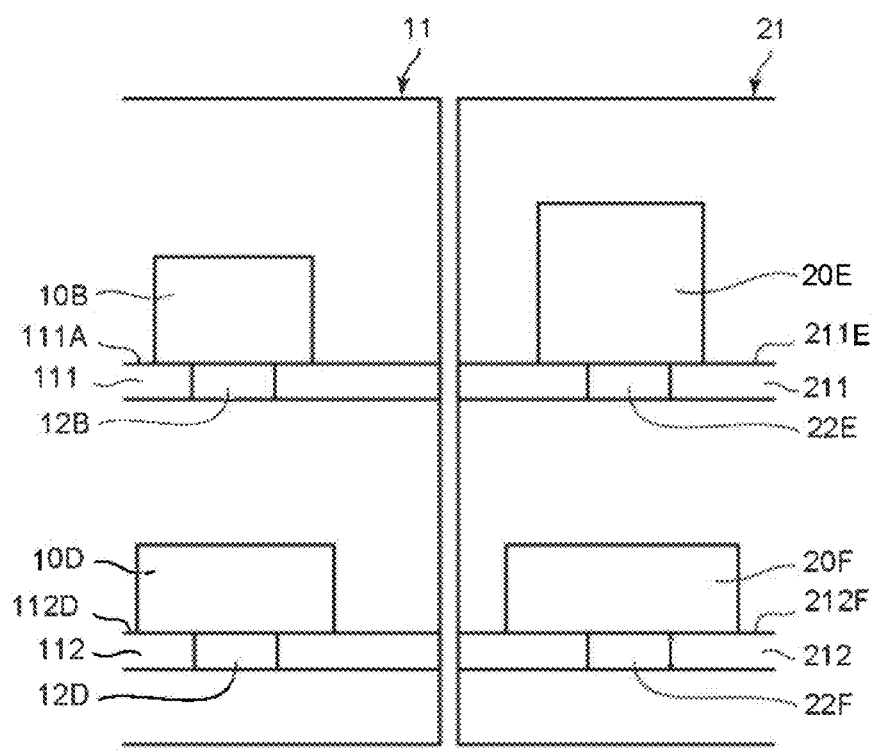
FIG. 8 is a diagram illustrating an example of a captured image according to the second embodiment, which shows an example in which the captured image includes a plurality of shelves.

FIG. 6 is a flowchart for depicting an example of shelf determination by the shelf determination system according to the second embodiment. FIG. 7 is a diagram illustrating an example of the relative relationship among the articles according to the second embodiment. FIG. 8 is a diagram illustrating an example of the captured image according to the second embodiment, and shows an example in which the captured image includes a plurality of shelves.

As shown in FIG. 6, the processor 101 of the shelf information determination apparatus 1 acquires the captured image captured by the camera 2 through the external device I/F 104 (ACT 21). For example, the method of acquiring the captured image is the same as that described in the first embodiment. Based on the shelf management information, the processor 101 recognizes a plurality of articles contained in the captured image (ACT 22). For example, the method of recognizing the plural articles is the same as that described in the first embodiment. Furthermore, the processor 101 specifies areas of a plurality of articles contained in the captured image. The method of specifying the areas may be template matching, a feature point matching or the like, and any method can be used as long as the positions of respective articles can be specified in addition to the types of the articles in the image.

Similar to the first embodiment, the recognition process of the article and the recognition process of the shelf label may be performed in a combined manner, or either one of the recognition processes may be performed. In a case of using the recognition process of the shelf label, the processor 101 specifies the area of the shelf label contained in the captured image.

The processor 101 generates a relative positional relationship (with diagram) of the plurality of articles from the areas of a plurality of articles in the captured image (ACT 23). Here, the generation of the relative positional relationship from the captured image is referred to as recognition of the relative positional relationship of the plurality of articles. Furthermore, the processor 101 generates the relative positional relationship (with diagram) of the plurality of articles based on the shelf management information and the article specifying information (article identification information) corresponding to the plurality of articles contained in the recognition result (ACT 23). The generation of the relative positional relationship from the shelf management information and the recognized article specifying information is referred to as the determination of the relative positional relationship of the plurality of articles. In this case, a plurality of relative positional relationships may be determined. For example, if a plurality of articles 10A, 10B, 10C and 10D contained in the recognition result is displayed on a plurality of shelves, the relative positional relationships of the plurality of shelves are determined.

For example, as shown in FIG. 7, the positional relationships among the respective articles are shown with a diagram using center coordinates of the article as the coordinates of the article. The relative positional relationship may be shown in any format such as character data as long as the relative positional relationship can be shown. In an embodiment, a plurality of same adjacent articles may be combined and considered as one article.

The processor 101 compares the relative positional relationship based on the recognized articles with the relative positional relationship determined by the shelf management information (ACT 24) to determine the shelf identification information (i.e., the shelf number) of the shelf on which the articles is placed (ACT 25). For example, the processor 101 outputs the shelf identification information of the shelf with which the comparison result with the highest similarity degree is derived as the determination result based on the comparison result.

A diagram illustrating the recognized relative positional relationship and a diagram illustrating the determined relative positional relationship are compared to determine which part of the shelf allocation plan is the captured place. Any comparison method may be used as long as similar relative positional relationships of the articles can be specified, such as a template matching or the like. Based on the comparison result, the processor 101 outputs the shelf identification information of the place with the highest similarity degree among the shelf allocation plan information as the determination result. The processor 101 may output the shelf identification information and the recognized article identification information in association with each other as the determination result.

For example, in the example in FIG. 7, the processor 101 outputs the shelf number 1 and the article identification codes of the articles 10A, 10B, 10C and 10D in an associated manner. At this time, the image of each area of the shelf number 1 may be output in association with the images of the articles 10A, 10B, 10C and 10D.

The captured image shown in FIG. 8 includes a plurality of different shelves. In this case, similarly, the location of the photographed shelf is specified in the shelf allocation plan according to the diagram showing the relative positional relationship. As a result, the images of the areas of the shelf number 1 may be output in association with images of the articles 10B and 10D, and the images of the areas of the shelf number 1 may be output in association with images of the articles 20E and 20F.

Third Embodiment

In the third embodiment, shelf determination using the shelf recognition is described.

The shelf determination system according to the third embodiment has the same basic configuration as the shelf determination system according to the first and second embodiments. In the third embodiment, differences from the first and second embodiments are mainly described.

Figure 9:
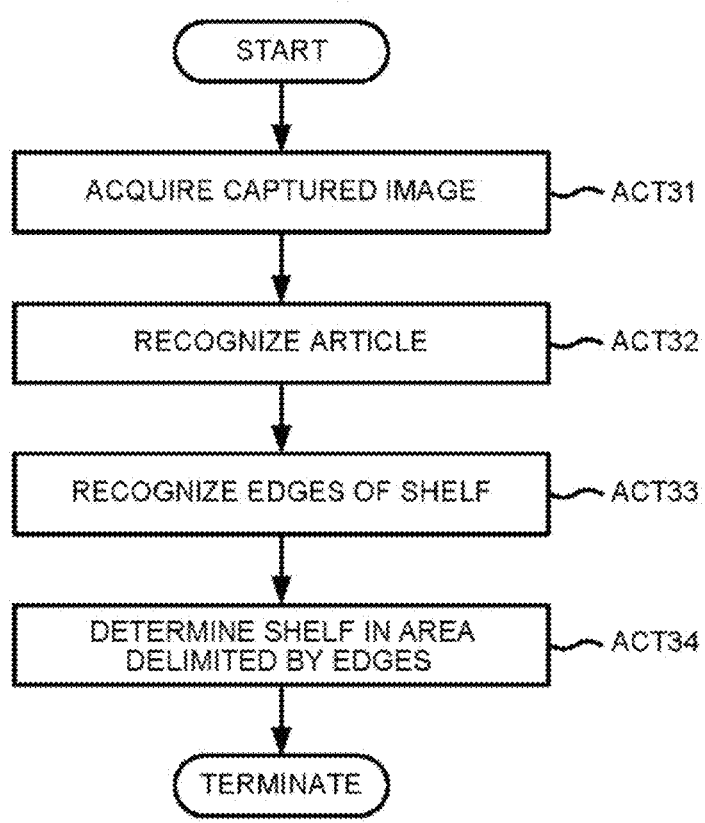
FIG. 9 is a flowchart for depicting an example of shelf determination by a shelf determination system according to a third embodiment.

FIG. 9 is a flowchart for depicting an example of the shelf determination by the shelf determination system according to the third embodiment.

As shown in FIG. 9, the processor 101 of the shelf information determination apparatus 1 acquires the captured image captured by the camera 2 via the external device I/F 104 (ACT 31). For example, the method of acquiring the captured image is the same as that described in the first and second embodiments. Based on the shelf management information, the processor 101 recognizes a plurality of articles contained in the captured image (ACT 32). For example, the method of recognizing the plurality of articles is the same as that described in the first and second embodiments.

Figure 10:
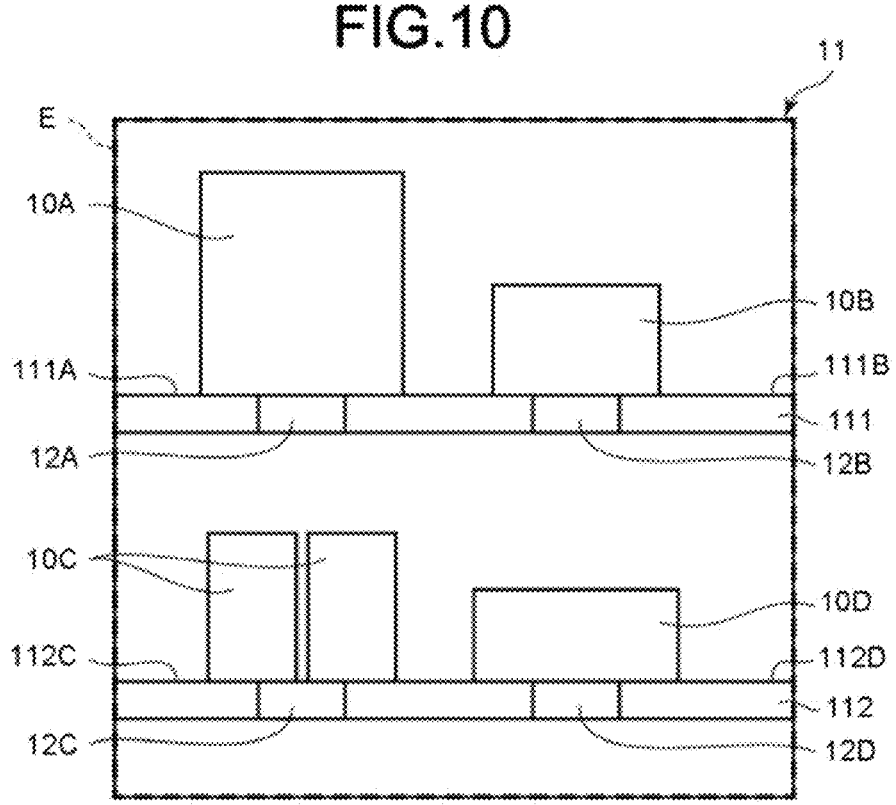
FIG. 10 is a diagram illustrating an example of an edge recognition result of a shelf according to the third embodiment.

The processor 101 detects edge information from the captured image to recognize the edge of the shelf based on the detection result (ACT 33). FIG. 10 is a diagram illustrating an example of the edge recognition result of the shelf. In recognition of the edge of the shelf, a place where the height of the tray changes may be recognized as the edge after the tray is recognized; alternatively, if an article positioned at an end of the shelf in the shelf management information is recognized, the end of the article may be recognized as the edge of the shelf. The method is not limited thereto as long as the edge of the shelf can be recognized.

The processor 101 determines the shelf identification information of the shelf to which an area surrounded by the edge of the shelf or an area delimited by the edge of the shelf belongs (ACT 34). For example, the processor 101 retrieves the shelf management information based on the article specifying information corresponding to the articles located within those areas, and outputs, as the determination result, the shelf identification information with which most of the article specifying information corresponding to the articles located within those areas is associated according to a majority determination process discussed below.

Alternatively, the memory 102 may store position information indicating a position photographed by the camera 2 and orientation information indicating orientation of the camera 2 in advance, and those types of information may be used to determine the shelf. For example, in advance, the memory 102 stores the position information, the orientation information, a captured image of the shelf roughly reflected using these position information and orientation information, and the shelf determination information associated with the shelf identification information of the shelf contained in the captured image. The processor 101 may determine the shelf identification information of the shelf contained in the captured image photographed by the camera 2 from the position information and the orientation information of the camera 2 and the shelf determination information in an image capturing operation. If the position information and the orientation information of the camera 2 in the image capturing operation are known, it is possible to determine the shelf contained in the captured image from the shelf determination information collected in advance. A shelf corresponding to a largest area among the areas in which the articles recognized from the captured image are contained may be determined.

An example of the majority determination process is described with reference to FIG. 5 and FIG. 10. As shown in FIG. 10, the articles 10A, 10B, 10C, and 10D are present in an area surrounded by the edge of the shelf. With reference to FIG. 5 for the articles 10A, 10B, 10C and 10D that are present, the articles 10A, 10B, 10C and 10D are all planned to be placed on the shelf corresponding to the shelf number 1, and it can be known that four articles are present on the shelf corresponding to the shelf number 1 in the area surrounded by the edge of the shelf according to FIG. 5 and FIG. 10. According to the above information, the processor 101 determines the area surrounded by the edge of the shelf to be the shelf corresponding to the shelf number 1. As a result, the shelf information determination apparatus outputs the determined shelf number and the article identification information corresponding to the plurality of recognized articles in an associated manner. At this time, the determined shelf number and the area surrounded by the edge of the shelf may be output.

According to at least one of the embodiments described above, by utilizing the recognition process, it is possible to accurately determine the shelf on which the article is placed without using a wireless devices or a marker. By using the information of the shelf label, it is possible to accurately determine the shelf on which articles which are in short supply or out of stock are placed. By using the recognition process, it is possible to accurately determine the shelf on which the article is placed based on the type of the recognized article. It is possible to accurately determine the shelf on which the article is placed based on the recognized relative positional relationship. It is possible to accurately determine the shelf on which the article is placed based on the edge of the recognized shelf. It is possible to accurately determine the shelf on which the article is placed based on the area surrounded by the edge of the shelf or the area delimited by the edge of the shelf. It is possible to accurately determine the shelf on which the article is placed based on the position information and the orientation information. By appropriately executing the shelf determination processes described above in a combined manner, it is possible to further improve the determination accuracy of the shelf. Based on the captured image and the determination result, a store clerk is not only able to easily identify the shelf that needs to be re-organized or restocked, but also to know the shelf or shelf location that attracts customers by monitoring the stock of the commodities displayed on the shelf.

The shelf determination process by the shelf determination system can be executed by one or more processors based on one or more software. Therefore, by installing one or more programs in the memory 102 of the shelf information determination apparatus 1 through a computer-readable storage medium in which one or more programs used for executing procedures of the above-described shelf determination process described above, it is possible to easily realize the shelf determination process. For example, the shelf information determination apparatus 1 may download the programs via the network, store the downloaded programs, and complete the installation of the programs. Alternatively, the shelf information determination apparatus 1 may read the above programs from the information storage medium, store the read programs, and complete the installation of the programs.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An information processing apparatus, comprising:
a camera interface configured to connect to a camera; and
a processor configured to:
   acquire shelf allocation plan information that indicates a shelf ID of each of a plurality of shelves in association with: a plurality of article IDs of articles displayed on the shelf, and a display location of each of the articles displayed on the shelf;
   control the camera via the camera interface to capture an image of a plurality of articles and a shelf displaying the articles;
   determine a plurality of article IDs for the articles shown in the captured image using a feature value of each of the articles;
   determine a positional relationship of the articles shown in the captured image;
   compare the determined positional relationship with a positional relationship of articles displayed on each of the shelves determined from the shelf allocation plan information; and
   determine, as a shelf ID of the shelf shown in the captured image, a shelf ID of one of the shelves displaying articles having a positional relationship closest to the determined positional relationship, wherein
   the determined shelf ID is associated with one or more of the determined article IDs.

2. The information processing apparatus according to claim 1, wherein
the positional relationship is represented by a diagram with a plurality sets of coordinates indicating a display location of an article on a shelf.

3. The information processing apparatus according to claim 2, wherein
two or more of same adjacent articles are considered as a single article in the diagram.

4. The information processing apparatus according to claim 1, wherein each of the article IDs indicates a type of the article.

5. The information processing apparatus according to claim 1, wherein
the processor is configured to:
   recognize an edge of the shelf in the captured image; and
   determine the article IDs for the articles shown within the recognized edge.

6. The information processing apparatus according to claim 1, wherein
the processor is configured to:
read one or more labels from the captured image each associated with an article; and
determine the article IDs of the articles shown in the captured image based on the labels.

7. The information processing apparatus according to claim 6, wherein
each of the labels shows a printed symbol that identifies an article.

8. The information processing apparatus according to claim 6, wherein
each of the labels is an electronic label configured to display or transmit information that identifies an article.

9. The information processing apparatus according to claim 1, wherein
the processor is configured to determine the article IDs after dividing the captured image into a plurality of blocks.

10. A method carried out by an information processing apparatus, comprising:
acquiring shelf allocation plan information that indicates a shelf ID of each of a plurality of shelves in association with: a plurality of article IDs of articles displayed on the shelf, and a display location of each of the articles displayed on the shelf;
capturing with a camera an image of a plurality of articles and a shelf displaying the articles;
determining a plurality of article IDs for the articles shown in the captured image using a feature value of each of the articles;
determining a positional relationship of the articles shown in the captured image;
comparing the determined positional relationship with a positional relationship of articles displayed on each of the shelves determined from the shelf allocation plan information; and
determining, as a shelf ID of the shelf shown in the captured image, a shelf ID of one of the shelves displaying articles having a positional relationship closest to the determined positional relationship, wherein
the determined shelf ID is associated with one or more of the determined article IDs.

11. The method according to claim 10, wherein
the positional relationship is represented by a diagram with a plurality sets of coordinates indicating a display location of an article on a shelf.

12. The method according to claim 11, wherein
two or more of same adjacent articles are considered as a single article in the diagram.

13. The method according to claim 10, wherein
each of the article IDs indicates a type of the article.

14. The method according to claim 10, further comprising
recognizing an edge of the shelf in the captured image, wherein
the article IDs are determined for the articles shown within the recognized edge.

15. The method according to claim 10, further comprising
reading one or more labels from the captured image each associated with an article, wherein
the article IDs are determined for the articles shown in the captured image based on the labels.

16. The method according to claim 15, wherein
each of the labels shows a printed symbol that identifies an article.

17. The method according to claim 15, wherein
each of the labels is an electronic label configured to display or transmit information that identifies an article.

18. An information processing system, comprising:
a camera;
a first apparatus configured to store shelf allocation plan information that indicates a shelf ID of each of a plurality of shelves in association with: a plurality of article IDs of articles displayed on the shelf, and a display location of each of the articles displayed on the shelf; and
a second apparatus comprising a processor configured to:
acquire the shelf allocation plan information from the first apparatus;
control the camera to capture an image of a plurality of articles and a shelf displaying the articles;
determine a plurality of article IDs for the articles shown in the captured image using a feature value of each of the articles;
determine a positional relationship of the articles shown in the captured image;
compare the determined positional relationship with a positional relationship of articles displayed on each of the shelves determined from the shelf allocation plan information; and
determine as a shelf ID of the shelf shown in the captured image, a shelf ID of one of the shelves displaying articles having a positional relationship closest to the determined positional relationship, wherein
the determined shelf ID is associated with one or more of the determined article IDs.

* * * * *